United States Patent [19]
Herchenbach

[11] 4,218,210
[45] Aug. 19, 1980

[54] SYSTEM AND METHOD FOR THE HEAT TREATMENT OF FINE GRAINED MATERIALS

[75] Inventor: Horst Herchenbach, Troisdorf, Fed. Rep. of Germany

[73] Assignee: Klockner-Humboldt-Deutz Aktiengesellschaft, Fed. Rep. of Germany

[21] Appl. No.: 874,497

[22] Filed: Feb. 2, 1978

[30] Foreign Application Priority Data

Feb. 10, 1977 [DE] Fed. Rep. of Germany ....... 2705566

[51] Int. Cl.² .............................................. F27B 7/02
[52] U.S. Cl. .................................. 432/106; 432/58; 106/100
[58] Field of Search .......................... 432/106, 14, 58; 34/57 A; 106/100

[56] References Cited

U.S. PATENT DOCUMENTS

| | | | |
|---|---|---|---|
| 3,864,075 | 2/1975 | Christiansen | 432/106 |
| 3,917,098 | 10/1975 | Kano et al. | 432/58 |
| 3,938,949 | 2/1976 | Christiansen | 432/14 |
| 3,940,241 | 2/1976 | Houd | 432/106 |
| 4,022,568 | 5/1977 | Meedom | 432/14 |
| 4,045,162 | 8/1977 | Christiansen | 432/106 |
| 4,094,626 | 6/1978 | Boyhont et al. | 432/106 |

FOREIGN PATENT DOCUMENTS

| | | | |
|---|---|---|---|
| 2262213 | 2/1975 | Fed. Rep. of Germany | 432/106 |
| 2356221 | 5/1975 | Fed. Rep. of Germany | 432/106 |

Primary Examiner—Henry C. Yuen
Attorney, Agent, or Firm—Hill, Van Santen, Steadman, Chiara & Simpson

[57] ABSTRACT

The present invention relates to a system and method for the heat treatment of finely divided materials, such as those used in the manufacture of cement. In the improved system of the present invention, two rows of suspension gas heat exchanges are provided, each row including a plurality of cyclone separators. A calcination furnace is connected to one of the rows, and a material cooler is connected to the other of the rows. In a preferred form of the invention, the row connected to the calcination furnace has at least one cyclone separator less than the row connected to the material cooler. A combustion device is also provided in conjunction with the material cooler to make more efficient use of the calcination furnace.

4 Claims, 1 Drawing Figure

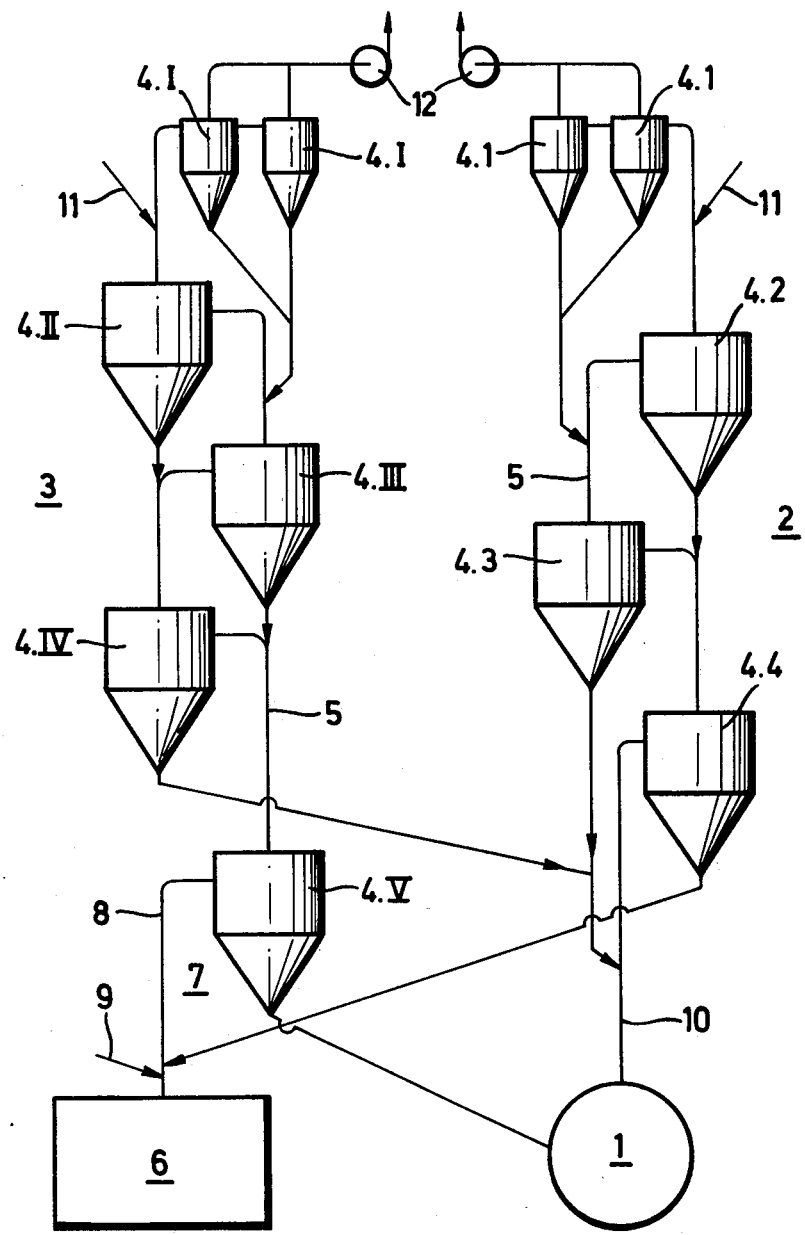

SYSTEM AND METHOD FOR THE HEAT TREATMENT OF FINE GRAINED MATERIALS

BACKGROUND OF THE INVENTION

1. Field of the Invention

This invention is in the field of heat treatment of finely divided materials such as pulverized raw material to be used in the manufacture of cement. It involves the use of two rows of cyclone separators arranged in series with a calcination furnace being connected to one of the rows and a material cooler being connected to the other of the rows. Significant increases in efficiency of heat utilization are achieved by controlling the parameters of operation in the rows of cyclone separators and the distribution of material therebetween.

2. Description of the Prior Art

In the case of previously conventional methods for the production of cement clinkers from pulverized raw material to be used in the manufacture of cement, the pulverized raw material is preheated in suspension type gas heat exchangers resulting in very little calcination. The preheated raw materials were subsequently conveyed into a rotary kiln for sintering but only about half of the rotary kiln would be used for sintering since one half had to be used for the calcining of the pulverized raw material. These installations were reasonably economical for average output yields up to approximately 2000 metric tons per day with respect to the distribution of the heat load between the suspension gas heat exchangers and the sintering furnace.

The trend to higher output yields had to be followed by improvements in conventional heat exchangers whereby the calcination of the pulverized raw material took place in the heat exchanger with the aid of a separate calcining device so that in the rotary kiln, only the sintering of the pulverized raw material would be undertaken and an appreciable thermal load was removed from the rotary kiln. In this manner, the output yields of the new installations could be increased without substantial enlargement of the dimensions or of the investment cost for the rotary kiln. With this development the suspension gas heater-rotary kiln system, it was possible to redesign or convert existing installations with only average outputs to installations with a high output yield.

In German Laid Open Specification No. 22 62 213 there is described a system combining a cyclone heat exchanger with a rotary kiln wherein the output was increased by adding an additional cyclone heat exchanger which acted on the exhaust air of the clinker cooler, so that in this heat exchanger the endothermic process of the complete calcination of the pulverized raw material to be used in the manufacture of cement took place. Both heat exchangers consisted in a series of four cyclone steps. The raw material which was delivered into the heat exchanger which acted on exhaust gases of the rotary kiln, after passing through the heat exchanger were subsequently conveyed to the heat exchanger which acted on the cooler exhaust air. The entire quantity of pulverized raw material of both heat exchangers, before the lowermost step of the heat exchanger acted on with the cooler exhaust air, was subjected to complete pre-calcination with an additional heat treatment.

In the case of this type of installation, however, the pre-calcination of the pulverized raw material is only obtained under unfavorable conditions, since with the same number of heat exchanger steps in the two parallel connected heat exchangers, the heat exchanger which is acted on by the hot air of the clinker-cooler and is provided with a calcination device must be driven with appreciably higher exhaust gas losses than the other which is acted on by the exhaust gases of the furnace. This increased loss of exhaust gas cannot be equalized by directing a higher quantity of pulverized raw material to the heat exchanger acted on by the cooler exhaust air.

SUMMARY OF THE INVENTION

The present invention provides a system of relatively simple construction and low investment cost which produces a uniformly high grade, pre-calcined pulverized raw material to be delivered to the furnace, and evidences losses in exhaust gas which are low in comparison with the previously known systems.

In accordance with the present invention, the heat exchanger row which is connected with the calcination furnace has at least one cyclone step less than the heat exchanger which is connected with the material cooler. A separate combustion device is connected to the material cooler in a manner which is known per se. The hot combustion furnace gases which constitute only approximately ⅓ of the entire quantity of exhaust gas of the installation give off their heat content with the smallest losses of exhaust gas to a fixed adjustable quantity of pulverized raw material. The hot combustion gases from the separate combustion device, which constitute approximately ⅔ of the entire quantity of exhaust gas similarly give off their heat content with less losses of exhaust gas in the multi-staged material cooler heat exchanger to the other larger partial quantity of pulverized raw material. The partial quantity of pulverized raw material which is preheated in the combustion furnace heat exchanger and the partial quantity of pulverized material which is preheated in the material cooler heat exchanger are so adjusted that the heat exchanger exhaust gases have substantially the same temperature. Both heat exchangers are uniformly thermally charged thereby, and have the same low exhaust gas temperatures before the induced suction fans or exhausters. As a result, the heat loss of exhaust gas is very low overall.

BRIEF DESCRIPTION OF THE DRAWINGS

The single FIGURE in the drawings shows schematically a cement production system with a five step and a four step heat exchanger being arranged in parallel relationship with each other.

DESCRIPTION OF THE PREFERRED EMBODIMENTS

In accordance with the present invention, the heat exchangers in the direction of material throughput are connected in series to each other up to the penultimate cyclone step. This is particularly advantageous if the separate combustion device mentioned above is positioned between the material cooler and the last cyclone step of the heat exchanger associated therewith. The entire pulverized raw material is combined before it is conveyed through the last and hottest cyclone steps of both heat exchangers. The entire quantity of the pulverized raw material may thus be overall uniformly and completely calcined in the subsequent cyclone steps. The use of the so-called short rotary kilns or other apparatus which serve solely for the sintering process is thereby rendered possible.

In a preferred embodiment of the invention, the penultimate cyclone steps in both series of heat exchangers are connected on the material discharge side with the last cyclone step of the calcination furnace heat exchanger, which in turn is connected in series on the material discharge side through the separate combustion device and the last cyclone stage of the material cooler heat exchanger with the calcination furnace. The advantage of this arrangement is that the entire pulverized raw material of the penultimate heat exchangers cools the hot furnace exhaust gases sufficiently in order to preheat the pulverized raw material in the heat exchanger system with the smaller number of stages without losses of exhaust gas. Also, the temperature level of the entire pulverized raw material is further stabilized uniformly before it is conveyed to the combustion device.

In a further embodiment of the invention, the penultimate cyclone steps in each case may be connected on the material discharge side with the separate combustion device which itself is connected in series with the last cyclone step of the heat exchanger associated with the combustion furnace. This conveyance of pulverized raw material is known per se through German Laid Out Patent No. 23 56 211. The heat exchanger installation of this known type of construction, however, consists of two cyclone heat exchangers arranged in parallel with one another, with four cyclone stages each. For achieving a uniform thermal load in the heat exchanger systems, however, the exhaust gas temperatures from the hottest cyclone steps in each series must also have the same temperature level. This means that in the separate combustion device, the device can only be fired to an extent that these conditions may be maintained. Then, however, a complete deacidification of the pulverized raw material in the heat exchanger system is not possible. If a complete calcination of the pulverized raw material in the heat exchange system is desired, then more fuel must be introduced into the separate combustion device. This, however, again leads to different temperatures at this point and to higher losses in the exhaust gas.

The difficulties enumerated above are prevented with the heat exchanger system according to the present invention and the conveyance of pulverized raw material here described. The almost completely calcined pulverized raw material in the separate combustion device is further calcined through prolonged treatment time at a high temperature level in the hottest step of the heat exchanger associated with the furnace exhaust gases so that completely calcined pulverized raw material may be conveyed for sintering in the rotary kiln.

The invention also relates to a method for operating the system previously described. It is characterized in that the heat treatment of the material in the heat exchanger which is acted on by the furnace exhaust gases proceeds in less stages and that in the heat exchanger which is acted on by the cooler exhaust air, the pre-calcination of the material takes place and the hot gases which issue from the hottest step of this heat exchanger have a temperature lying preferably at least 100° C. in excess of the hot gases at the same point in the other exchanger system. The combustion gases of the separate combustion device may therefore give off their heat content reliably into a heat exchanger having at least one additional stage through a portion of the pulverized raw material. The exhaust gas temperatures at both heat exchangers are thereby held at the same level which decreases the specific utilization of heat in the installation.

Turning now to the drawings, there is shown a pair of heat exchangers 2 and 3 arranged parallel to one another and connected in series with a rotating cylindrical kiln 1. Each heat exchanger system consists of a plurality of cyclone separators connected consecutively on the exhaust gas side whereby the fine grained material such as pulverized raw material to be used in the manufacture of cement is guided stepwise through the exhaust gas conduits 5 connecting the cyclone separators and preheated by countercurrent contact with the direction of flow of the hot treatment gases. Connected in series with the combustion furnace 1 is a material cooler 6.

In accordance with the present invention, the heat exchanger 2 connected with the calcination furnace 1 has four cyclone stages 4.1 to 4.4, while the suspension gas heat exchanger 3 connected with the material cooler 6 has five cyclone steps 4.I to 4.V. The uppermost cyclone steps 4.1 and 4.I in each case are constructed as double cyclones.

Viewed in the direction of material flow, the cyclone stages 4.4 and 4.V of the two heat exchangers 2, 3, are connected in series. The penultimate cyclone stages 4.3 and 4.IV in each case are connected on the material discharge sides and are connected with the last cyclone stage 4.4 of the heat exchanger 2. The last cyclone stage of the combustion furnace heat exchanger 2 is connected on the material discharge side with a separate combustion device 7 which is arranged in a gas conduit 8 extending from the material cooler 6 to the lowermost cyclone stage of the material cooler heat exchanger 2. This separate combustion device has a separate fuel supply 9. The last cyclone stage 4.V of the heat exchanger 3 is connected on the discharge side with the combustion furnace 1.

In operation, a predetermined quantity or partial quantity of pulverized raw material to be used in the manufacture of cement is supplied to the two heat exchangers 2, 3, with the larger partial quantity (approximately 3/5 to ⅔) being supplied to the heat exchanger 3. The feed of the cold pulverized raw material takes place in the upper areas of the heat exchangers as indicated at reference numeral 11, and the withdrawal of gases is undertaken through ventilators 12 so that viewed as a whole, the pulverized raw material passes through the hot gases in counter current contact. The pulverized raw material flows through the heat exchangers 2, 3, separately up to the penultimate cyclone stages 4.3 and 4.IV, respectively. The partial quantities of pulverized raw material which upon issue from the cyclone step 4.3 and the cyclone step 4.IV have approximately the same temperature level are combined, and the entire quantity of pulverized raw material is delivered into the furnace exhaust gas conduit 10 leading from the combustion furnace 1 to the last cyclone stage 4.4 of the combustion furnace heat exchanger 2. Here, the hot furnace exhaust gases which constitute approximately ⅓ of the entire quantity of exhaust gas give off their heat content optimally to the entire pulverized raw material so that these hot gases have at the gas outlet of the last cyclone step temperatures of approximately 800° C. The pulverized raw material separated off from the cyclone step 4.4 is introduced into the separate combustion device 7 into which there is a high feed or fuel from the fuel line 9.

The pulverized raw material is almost completely calcined in the separate combustion device 7 and is subsequently separated off in the hottest cyclone stage 4.V of the heat exchanger 3 and thereafter introduced into the combustion furnace 1. The exhaust gases from the cyclone stage 4.V connected on the outlet side of the separate combustion device 7 and constituting approximately ⅔ of the entire quantity of exhaust gas have a temperature of approximately 900° C. which lies at approximately 100° C. above the exhaust gas temperature of the cyclone stage 4.4 at the same point on the other heat exchanger. The heat content of this quantity of gas is given in four stages in optimal manner to the part of the quantity of pulverized raw material which is delivered to the heat exchanger 3. The heat content of the 800° quantity of exhaust gas of the last cyclone stage 4.4 of the heat exchanger 2 is delivered in three stages to the other part of the quantity of pulverized raw material delivered to this heat exchanger. The partial quantities of pulverized raw material in each heat exchanger are so selected that the exhaust gas temperatures at corresponding points in the penultimate cyclone stage in each heat exchanger are substantially the same. This optimizes the specific utilization of heat through the lowest losses of exhaust gas.

The heat exchanger system in accordance with the present invention is not limited to the type of embodiment shown, but can be used, for example, where the combustion furnace heat exchanger contains only three stages while the material cooler heat exchanger has four stages with a pre-calcination. In distinction to the heat exchanger installation shown, the penultimate cyclone stages 4.3 and 4.IV in each case are connected directly with the combustion device 7 and the last cyclone stage 4.V of the heat exchanger 3 may be connected on the discharge side with the exhaust gas conduit 10 leading from the combustion furnace 1 to the last cyclone stage 4.4 of the combustion furnace heat exchanger. This cyclone stage discharges on the discharge side into the combustion furnace 1.

It will be evident that various modifications can be made to the described embodiments without departing from the scope of the present invention.

I claim as my invention:

1. A system for the heat treatment of fine grained materials such as pulverized raw material to be used in the manufacture of cement, comprising:
    two rows of suspension gas heat exchangers, each row including a plurality of cyclone separators, each said row having a penultimate cyclone separator and the penultimate cyclone separators in each row having their discharge line connected together,
    a calcination furnace connected to one side of said rows,
    a material cooler connected to the other of said rows,
    the row connected to said calcination furnace having at least one cyclone separator less than the row connected to said material cooler, and
    a combustion device connected to said material cooler.

2. A system according to claim 1 which includes:
    means connecting said discharge lines with the last cyclone separator in the row connected to said calcination furnace, and
    means connecting said last cyclone separator to said combustion device and the last cyclone separator of the row connected to said calcination furnace.

3. A system according to claim 2 which includes:
    means connecting the discharge side of the last cyclone separator in the row connected to said calcination furnace with said calcination furnace.

4. A system according to claim 1 which includes:
    means connecting together the discharge sides of the last cyclone separator of the row connected to the calcination furnace and the penultimate cyclone separator of the row connected to the material cooler with said combustion device, and
    means connecting the discharge side of the last cyclone separator of the row connected to said material cooler with said calcination furnace.

* * * * *